United States Patent [19]

Miller

[11] 4,053,205
[45] Oct. 11, 1977

[54] OPTICAL FIBER HAVING REDUCED DISPERSION

[75] Inventor: Stewart Edward Miller, Locust, N.J.

[73] Assignee: Bell Telephone Laboratories, Incorporated, Murray Hill, N.J.

[21] Appl. No.: 710,137

[22] Filed: July 30, 1976

[51] Int. Cl.² .................................................. G02B 5/14
[52] U.S. Cl. ........................... 350/96 GN; 350/96 WG
[58] Field of Search .... 350/96 WG, 96 GN, 175 GN

[56] References Cited

U.S. PATENT DOCUMENTS

| | | | |
|---|---|---|---|
| 3,617,917 | 11/1971 | Uchida | 350/96 GN X |
| 3,909,110 | 9/1975 | Marcuse | 350/96 WG |
| 3,916,182 | 10/1975 | Dabby et al. | 350/96 WG X |

FOREIGN PATENT DOCUMENTS 1,448,080  9/1976  United Kingdom .......... 350/96 WG

Primary Examiner—John K. Corbin
Assistant Examiner—Rolf Hille
Attorney, Agent, or Firm—Stephen M. Gurey

[57] ABSTRACT

Dispersion is reduced in a graded index optical fiber having a finite number of core layers by introducing slow longitudinal variations into the index of refraction of each layer. The index of refraction of each layer varies between a maximum which is proximate in value to the minimum index of refraction of the more central radially adjacent layer and a minimum which is proximate in value to the maximum index of refraction of the next furthermost radially adjacent layer.

6 Claims, 3 Drawing Figures

INDEX OF REFRACTION

OPTIMUM PROFILE

APPROXIMATION BY LAYERS

RADIUS

OPTICAL FIBER HAVING REDUCED DISPERSION

BACKGROUND OF THE INVENTION

This invention relates to optical fibers and, more particularly, to the reduction of dispersion in optical fibers.

In order to transmit information in the form of light pulses on an optical fiber transmission line the transmitted pulses must be individually resolvable at the receiving end of the transmission line. A light ray, however, may take different paths as it traverses the optical fiber. For example, the light ray may proceed directly down the center of the fiber or it may be reflected off the fiber walls numerous times as it traverses the fiber. Since the distance travelled by a light ray varies on each path, each transmission mode has a different transmission time associated with it. Different parts of a light pulse may traverse the fiber in different modes and thus with different traversal times. As a result, there is a general broadening of the pulse and a consequent loss in pulse resolution.

A method for reducing dispersion in a step-index multimode fiber waveguide is disclosed in U.S. Pat. No. 3,909,110, issued Sep. 30, 1975 to D. Marcuse. As described therein, dispersion is reduced by the introduction of slight fluctuations in the refractive index of the fiber core, which fluctuations deliberately enhance coupling among the various modes in the fiber. Conditions are imposed upon the axial, azimuthal and radial dependence of the core fluctuations. The axial fluctuations take the form of slight perturbations in the refractive index and have a period of approximately 1 mm. A fiber having such small perturbations is both difficult and expensive to fabricate.

Mode dispersion can also be minimized by radially grading the index of refraction of the fiber core from a maximum at the center of the fiber to a minimum at the core-cladding interface. It has been determined that an optimum refractive index profile is parabolic in shape. A fiber with such a smooth continuous profile is not readily fabricated, and is therefore approximated by a plurality of thin cylindrical layers each having a uniform refractive index. The refractive indices of these core layers radially decrease from a maximum at the center of the core to approximate the optimum smooth profile. As can be readily appreciated, as the number of core layers increases, the smooth continuous profile is more closely approximated and the dispersion of a transmitted light impulse decreases. However, in such fibers the theoretical improvement expected from a continuous radial gradation can only be approached, and some pulse broadening still occurs. This pulse broadening increases proportional to the length of the fiber.

A graded index optical fiber such as described hereinabove is readily fabricated using a chemical vapor deposition process described in copending application Ser. No. 444,705, filed Feb. 22, 1974 and assigned to the assignee of the present invention. As described therein, a preform is formed by continuously rotating a silica tube which is traversed by a hot zone. A vapor source material such as the chlorides or hydrides of silicon together with germanium, aluminum, boron, phosphorus, et cetera, and oxygen, flows through the tube and reacts in the hot zone to produce glassy "soot" within the vapor and glass on the inner surface of the tube. For each traversal of the hot zone a cylindrical layer of glass is fused into the tube. By varying the composition of the vapor source for each hot zone traversal, a radially graded structure is formed. When the tube is collapsed and a fiber drawn therefrom, the resulting fiber has the same refractive index radial distribution as the preform. As aforenoted, many layers are necessary to approximate the impulse response of a smoothly graded optical fiber. Since each layer is be fused separately onto the tube, the fabrication time of a preform from which a satisfactory optical fiber can be drawn is long and thus expensive.

SUMMARY OF THE INVENTION

An object of the present invention is to reduce dispersion in an optical fiber waveguide.

In accordance with the present invention, dispersion is reduced in a graded index optical fiber waveguide having a finite number of core layers by introducing longitudinal variations into the index of refraction of each layer. The variations in the index of refraction occur slowly along the fiber axis. In addition, the index of refraction of each layer varies between a maximum which is proximate in value to the minimum index of refraction of the radially more central adjacent layer and a minimum which is proximate in value to the maximum index of the next furthermost radially adjacent layer.

It is a feature of the invention that the pulse dispersion in a fiber employing the present invention is less than the pulse dispersion in a prior art fiber having the same number of core layers; and increases proportional to the square root of fiber length rather than directly with fiber length.

DETAILED DESCRIPTION

Figure 1:
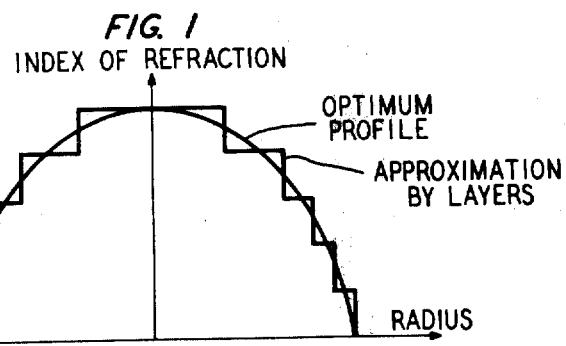
FIG. 1 shows the optimum smooth refractive index profile and a step approximation of the same.

As aforenoted, the optimum refractive index profile is a smooth parabolic function which decreases from a maximum at the center of the fiber to a minimum at the core-cladding interface. This optimum profile which gives minimum dispersion is illustrated in FIG. 1. However, a fiber having such a profile cannot be readily fabricated, but is approximated by the finite number of discrete layers which have indices of refraction that approximate the optimum profile. The approximation of the optimum profile by these discrete layers is illustrated in FIG. 1 for an illustrative five cylindrical layers. It should be noted, however, that many more layers are used to approximate the optimum profile.

As the number of layers used to approximate the smooth profile increases, the dispersion of a light pulse transmitted on the fiber decreases and more closely approximates the dispersion of a light pulse transmitted on an optical fiber having the optimum smooth profile. Since many layers are required to approximate the smooth profile satisfactorily, it is desirable to reduce the dispersion of a graded index optical fiber so that fewer layers are necessary with a resultant reduction in the cost of fiber fabrication. By employing the principles of the present invention fewer layers can be used to approximate the optimum profile. For a given number of layers, the dispersion of a light pulse transmitted on a fiber employing the present invention is less than the dispersion of a light pulse transmitted on the prior art fiber.

Figure 2:
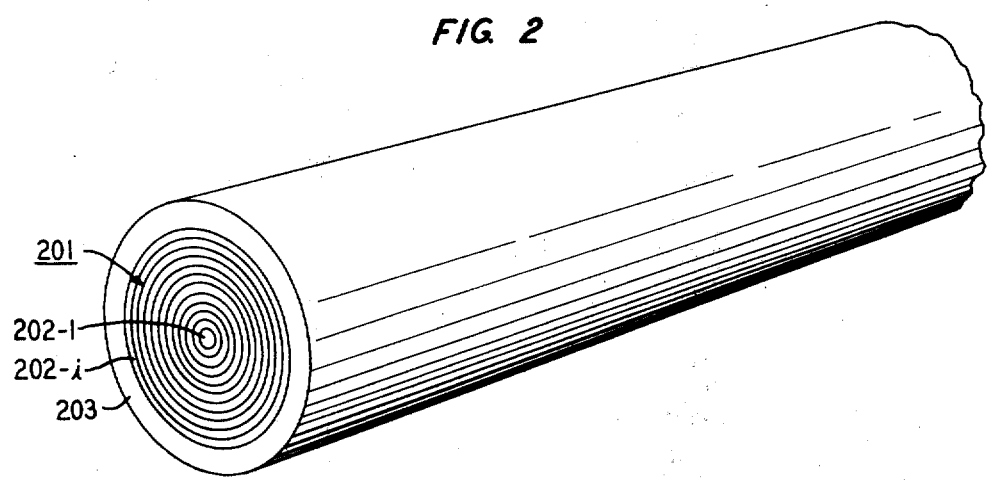
FIG. 2 is a graded index optical fiber in accordance with the present invention having a finite number of layers.
Figure 3:
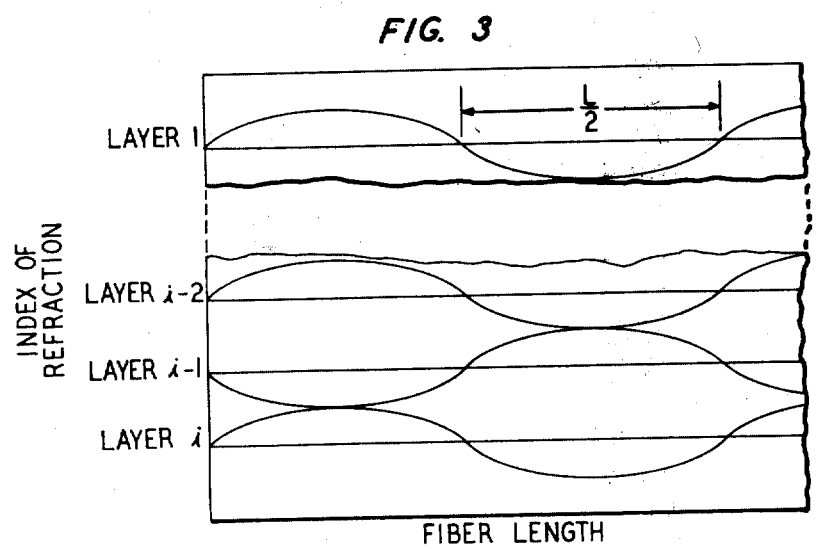
FIG. 3 shows the relationship between the refractive index of each radial layer and the longitudinal distance along the fiber axis for the fiber in FIG. 2.

FIG. 2 shows an optical fiber embodying the principles of the present invention. A core 201 includes $i$ cylindrical layers 202-1 through 202-$i$, with individual refractive indices that decrease from a maximum at the center 202-1. The core 201 is surrounded by a cladding 203 having an index of refraction less than the index of layer 202-$i$. In accordance with the present invention the fiber structure is modified such that a longitudinal variation is introduced in the index of refraction of each layer. FIG. 3 illustrates the index of refraction for each illustrative layer versus the longitudinal distance $z$ along the fiber. As can be noted, the index of refraction of each layer sinusoidally varies along the fiber axis between a maximum and minimum. In particular, the period, L, of such variations is in the range of 0.1 meter to 400 meters with a preferred range of 10 to 100 meters. In addition, as can be noted in FIG. 3, the minimum refractive index of each layer is proximate in value to the maximum index of refraction of the radially next furthermost adjacent layer. Also, the maximum index of refraction of each layer is proximate in value to the minimum refractive index of the radially more central adjacent layer.

As shown in FIG. 3, the preferred period of variation in each layer is equal and the minima of each layer are spatially aligned with the maxima in the radially next furthermost adjacent layer and the maxima are aligned with the minima in the radially more central adjacent layer. Dispersion reduction, however, can also be achieved when the refractive index variations are aperiodic or when the periods of variations of each layer are unequal and the maxima and minima are not spatially aligned longitudinally along the fiber axis.

The optical fiber structure of the present invention advantageously results in gross distortion of the field configuration within the fiber unlike the prior art structures which result in only minimal perturbations in the field configuration. The prior art fibers having high frequency longitudinal variations (of the order of from 1 to 10 mm) result in adiabatic mode conversion and require no cross sectional nonuniformity in the index of refraction to effect the requisite mode conversion. In the present invention, however, the low frequency longitudinal variations in the index of refraction, when coupled with a nonuniform cross sectional index of refraction, yield efficient nonadiabatic mode conversion. The resulting mode conversion yields a transmitted pulse width which increases with the square root of the fiber length rather than directly with fiber length, as is the case without efficient mode conversion.

Although any nonuniformity in cross sectional index of refraction when coupled with a low frequency longitudinal variation is sufficient to obtain this nonadiabatic mode conversion, particular advantages result when the cross sectional index of refraction is graded from a maximum at the center to a minimum at the fiber perimeter. Under such circumstances, one gains the advantage of having both a radially graded fiber and a mode-mixing fiber in one single configuration.

The fiber of the present invention can be fabricated using the modified chemical vapor deposition process described in the aforenoted copending patent application, Ser. No. 444,705. By varying the dopant such as the germanium or the boron as the flame traverses along the tube during the preform fabrication, the index of refraction of each layer is modulated between predetermined maximum and minimum values. Alignment of the maxima and minima is achieved by spatially registering the beginning of each flame traversal together with dopant concentration.

The above described arrangement is illustrative of the application and principles of the invention. Other embodiments may be devised by those skilled in the art without departing from the spirit and scope of the invention.

What is claimed is:

1. A graded index optical fiber having decreased optical dispersion comprising a core member and a cladding surrounding said core member, said core member including a plurality of layers the refractive indices of which radially decrease from a maximum at the center of the fiber

CHARACTERIZED IN THAT the index of refraction of each of said layers has spatial fluctuations along the longitudinal axis of said fiber, the fluctuations in the refractive index of each layer occuring slowly, the minimum refractive index of each layer being proximate in value to the maximum index of the radially next furthermost adjacent layer, and the maximum refractive index of each layer being proximate in value to the minimum index of the radially more central adjacent layer.

2. A graded index optical fiber as defined in claim 1 further characterized in that the distance between maxima in the index of refraction of each layer is within the range of 0.1 meter to 400 meters.

3. A graded index optical fiber as defined in claim 2 further characterized in that the distance between maxima in the index of refraction of each layer is within the range of 10 meters to 100 meters.

4. A graded index optical fiber as defined in claim 1 further characterized in that said spatial fluctuations are periodic along the longitudinal axis of said fiber.

5. A graded index optical fiber as defined in claim 4 further characterized in that the period of said spatial fluctuations is equal in each layer.

6. A graded index optical fiber as defined in claim 5 further characterized in that the longitudinal spatial positions of the minima in the refractive index of each layer are proximate to the longitudinal spatial positions of the maxima in the refractive index of the adjacent layers.

* * * * *